United States Patent [19]

Kushida

[11] 3,831,222

[45] Aug. 27, 1974

[54] MEANS FOR COUPLING A BLADE TO AN ARM OF WINDSHIELD WIPER FOR AUTOMOBILES

[75] Inventor: Tadao Kushida, Odahara, Japan

[73] Assignee: Ichiko Industries, Limited, Shinagawa-ku, Japan

[22] Filed: Mar. 28, 1973

[21] Appl. No.: 345,789

[52] U.S. Cl. ............................................ 15/250.32
[51] Int. Cl. ............................................. B60s 1/40
[58] Field of Search ....... 15/250.31, 250.32, 250.34, 15/250.42

[56] References Cited
UNITED STATES PATENTS

| | | | |
|---|---|---|---|
| 2,925,616 | 2/1960 | Krohm | 15/250.32 |
| 3,056,160 | 10/1962 | Oishei et al. | 15/250.32 |
| 3,135,983 | 6/1964 | O'Shei | 15/250.32 |

FOREIGN PATENTS OR APPLICATIONS

| 1,560,522 | 2/1969 | France | 15/250.32 |
|---|---|---|---|

Primary Examiner—Peter Feldman
Attorney, Agent, or Firm—Wenderoth, Lind & Ponack

[57] ABSTRACT

Means for coupling a blade to an arm of windshield wiper for automobiles comprising (1) a housing having a top wall and two side walls cooperatively defining a channel for the insertion of the arm and (2) an arm nipping means fixed within the housing and including an upper resilient member and a lower resilient member. Each of the side walls of the housing has an upper and a lower horizontal flange at its one end to define an arm introducing inlet. The upper resilient member has a receiving hole to engage a projection of the arm. The lower resilient member has a projection to be inserted into the through-hole or a recess of the arm. Because of this structure of the coupling means, the latter is capable of firmly holding any one of the arms of the type having a projection and a recess and of a type having only a through-hole. The free outer end of the upper resilient member fixed within the housing is exposed outwardly from one end of the channel, whereas the free outer end of the lower resilient member is exposed from the longitudinal elongated opening formed on the lower side of the channel. Thus, by holding the exposed portions of these two resilient members away from each other, the attachment and the detachment of the arm can be performed very easily without damaging the arm and these resilient members.

7 Claims, 8 Drawing Figures

MEANS FOR COUPLING A BLADE TO AN ARM OF WINDSHIELD WIPER FOR AUTOMOBILES

BACKGROUND OF THE INVENTION a. Field of the Invention

The present invention is concerned with a device for use in windshield wiper for automobiles, and more particularly, it pertains to an improvement in means for coupling a blade to an arm of windshield wiper for automobiles.

b. Description of the Prior Art

Conventional means for coupling a blade to an arm of windshield wiper for automobiles (hereinafter to be referred to briefly as coupling means) has been designed to be suitable for an arm of a particular configuration, and it has been impossible to attach, to this means, an arm having a different configuration. Thus, conventional coupling devices had the drawback that they were not usable for arms of different configurations.

Conventional arms designed for being coupled to a blade by a coupling means may be divided roughly into two types. One such type of arm has the structure that it has a recess on that surface facing the windshield, i.e. the rear face, at a site in the vicinity of its free outer end, and has a projection on the reverse side, i.e. the front face at a site corresponding to the position of said recess. The other type of arm has, in place of the aforesaid recess and projection, has a through-hole extending from the front face to the rear face at a site in the vicinity of its free outer end.

On the other hand, some conventional coupling means in general are of a channel-like configuration. Such coupling means of the prior art has an upper leaf spring member at a position below the top wall which connects the two side walls of the channel. Alternatively, other conventional coupling means are of a lower leaf spring member along the elongated opening which extends longitudinally of the channel.

Such coupling means for windshield wipers as shown in U.S. Pat. No. 3,071,798 is of the type having an upper leaf spring member, and this coupling means exhibits a strong holding ability for an arm of the first type stated above. However, it exhibits a very limited holding power for the arm of the second type, i.e. the arm having no projection on its front side.

Also, the known coupling device, as shown in FIG. 1, comprising a lower leaf spring member provided with a stopper projection which is to be engaged in the recess formed on the rear side of the arm or engaged in the through-hole of the arm and further comprising an aperture provided in the top wall of the channel for receiving the projection of the arm, is capable of holding each of the arms of said first and second types. However, such a device as this is weak in the power of holding any one of these arms. Whenever an external force, such as warping or twisting force, is applied to the arm, the latter may be caused to be spontaneously withdrawn from its coupling means.

SUMMARY OF THE INVENTION

It is, therefore, an object of the present invention to provide means for coupling a blade to an arm of a windshield wiper for automobiles, which allows any one of the aforesaid two type of arms to be firmly received in its housing.

Another object of the present invention is to provide a coupling means of the type described, which was an enhanced power of holding an arm of any of said two types and which does not cause this arm to casually come off once the arm is attached in place to this coupling means.

Still another object of the present invention is to provide a coupling means of the type described, which allows an arm to be attached to and detached from the coupling means with a very simple procedure.

These and other objects as well as the features of the present invention will become apparent by reading the following detailed description of the preferred embodiments when taken in conjunction with the accompanying drawings.

DETAILED DESCRIPTION OF THE PREFERRED EMBODIMENTS

Figure 1:
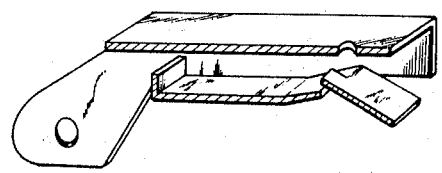
FIG. 1 is a perspective view, in a longitudinal section, showing diagrammatically the coupling device of the prior art.
Figure 2:
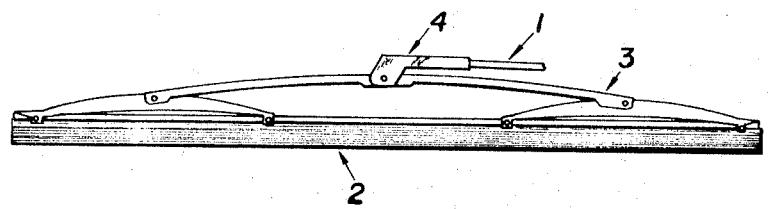
FIG. 2 is a somewhat diagrammatical illustration showing the manner in which the coupling means of the present invention is being used.

FIG. 2 diagrammatically shows the manner in which the coupling means of the present invention is being used. In this drawing, an arm 1 is connected to a blade unit 2 via a pressure unit 3 and a coupling means 4.

The arm 1 preferably has a rectangular cross-section and has a recess on its rear face and a projection on the front face or has a through-hole formed through the arm, at a site in the vicinity of its free outer end. These recess and projection or said through-hole are or is arranged to engage their corresponding portions (of the nipping means which will be described later) of the coupling means 4 to secure the arm 1 to the coupling means 4. This arm 1 is rotatably mounted, at its other end, onto a driven element such as a pivot pin.

The blade unit 2 includes an elastic wiper element and its support.

The pressure unit 3 in general can have various kinds of configurations. In the instance shown here, however, the pressure unit 3 is comprised of a first yoke and two second yokes. The second yokes are connected each at its opposite ends to the support of the wiper element.

Furthermore, each of these second yokes is pivotally attached, substantially at its center, to one end of the first yoke. The first yoke is rotatably attached, substantially at its center, to the coupling means 4 by a cross pin.

The coupling means of the present invention is comprised of a housing 10 and nipping means for the wiper arm. This nipping means is fixed in the housing. This nipping means is comprised of an upper resilient member 30 and a lower resilient member 40.

Figure 3:
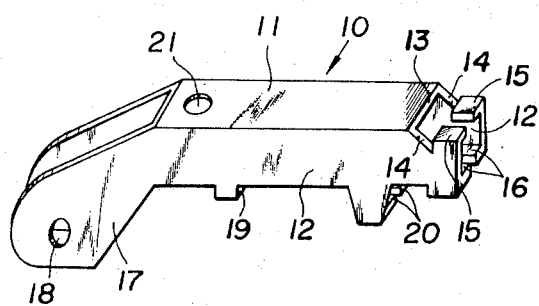
FIG. 3 is a perspective view showing a preferred configuration of the housing employed in the coupling means of the present invention.

The housing 10, as shown in FIG. 3, is of an open-bottomed, channel-like structure having inwardly bent portions locally. Inside this channel-shaped space, there are fixedly housed the upper resilient member 30 and the lower resilient member 40. The housing 10 has a top wall 11 and side walls 12, 12 for defining the channel. These side walls 12 and 12 are symmetrical in configuration relative to the longitudinal plane on the channel. Therefore, it will be sufficient to explain only one side wall 12. That end of the side wall 12 which is located on the side at which an inlet for the introduction of the arm 1 into the channel is formed extends beyond one end 13 of the top wall 11. An inclined upper edge 14 of said end extends with a gradual, downward inclination as it goes closer to said arm introducing inlet starting at the side at which said upper edge 14 joins the end 13 of the top wall 11. At the extreme terminal of this inclined upper edge 14 located on the arm introducing inlet side, there is carried integrally an upper flange 15 which is bent horizontally towards the interior of the channel. Just below this upper flange 15, there is carried integrally a similar flange 16 which is bent horizontally into the channel at the lowermost end on the side wall 12 in parallel relation with the flange 15. The pair upper flanges 15 and 15 and the pair lower flanges 16 and 16 of the side walls 12 and 12 define the arm introducing inlet and at the same time they serve as the guide for the insertion of the arm into the channel. It is needless to say that the two upper flanges 15 and 15 require to be separated from each other with a distance sufficient for the passage therethrough of the projection of the arm.

The side wall 12 has an enlarged portion 17 at the other ends thereof. This enlarged portion 17 is offset downwardly from the central axis of the channel. A connection hole 18 is formed in the vicinity of the lower end of the enlarged portion 17. At the time the coupling means is in use, a cross-pin is inserted through this connection hole 18 to connect this coupling means to the pressure unit 3 of the wiper.

At a site of the side wall 12 somewhat away from said enlarged portion 17 and closer to the arm introducing inlet, there is integrally carried an engaging finger 19 which is bent horizontally into the channel at the lower edge of the side wall 12. At a site between this engaging finger 19 and said lower flange 16, the side wall 12 locally has a downwardly projecting portion. At the lower end of this projecting portion, there is integrally carried an intermediate flange 20 which is bent horizontally into the channel. This intermediate flange 20 defines the lower limit of the movement of the lower resilient member 40.

The top wall 11 connecting the two sides of walls 12 and 12 extends from the upper ends of the inclined upper edges 14, 14 of the side walls to the upper end of the enlarged portion 17, and this top wall 11 has an anchoring hole 21 on the upper end side of the enlarged portion 17. This anchoring hole 21 is intended for anchoring the upper resilient member 30 thereat.

Figure 4:
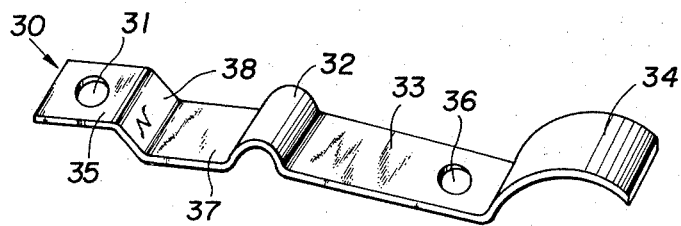
FIG. 4 is a perspective view showing a preferred type of the upper resilient member employed in the coupling means of the present invention.

This upper resilient member 30 desirably is made with a steel leaf spring. As shown in FIG. 4, this upper resilient member 30 has an integral continuous structure, starting from one end to the other end, consisting of a fixing portion 35 having a fixing hole 31, an inclining portion 38 which inclines obliquely downwardly from the fixing portion, a flat portion 37, an upwardly curved fulcrum 32, a resilient portion 33 which inclines obliquely downwardly at an angle more gentle than that of the inclined portion 38 and which has at its end a receiving hole 36, and an obliquely upwardly inclined nose 34, all as the contiguous parts.

Figure 5:
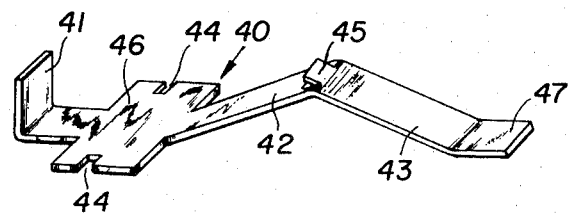
FIG. 5 is a perspective view showing a preferred type of the lower resilient member employed in the coupling means of the present invention.

The lower resilient member 40 desirably is made with a steel leaf spring. As shown in FIG. 5, this lower resilient member 40 has, as a continuous structure starting from one end to the other end, an upright stopper 41 for the arm, a broadened portion 46 having engaging grooves 44, 44 formed on the bilateral edges thereof, an obliquely upwardly inclined resilient portion 42, and an inclining portion 43 which inclines obliquely downwardly and which has projection 45 formed at its apex by the upward and downward inclinations, and a flat portion 47, all as the contiguous integral parts thereof.

Figure 6:
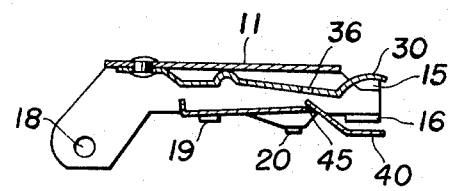
FIG. 6 is a longitudinal sectional view of the coupling means of the present invention.

As shown in FIG. 6, the upper resilient member 30 is fixed, at the fixing hole 31, to the anchoring hole 21 of the top wall of the housing by means of a fixing member 35. At such a state, the fulcrum 32 contacts the inner surface of the top wall, and the resilient portion 33 assumes a downwardly inclined position towards the arm introducing inlet. The nose 34 at such a state is arranged to expose itself upwardly from the aperture which is defined by the end edge 13 of the top wall, the inclined upper edges 14, 14 and the upper flanges 15, 15 of the side walls.

As will be understood from FIG. 6, the lower resilient member 40 is fixed within the housing in such a manner that the engaging grooves 44, 44 of the broadened portion 46 of the lower resilient member 40 are engaged by the engaging fingers 19, 19 which are carried at the lower edges of the side walls of the housing. At this state, the resilient portion 42 assumes an upwardly inclined position towards the arm introducing inlet. The obliquely inclined portion 43, on the other hands, is arranged to expose itself downwardly from the space defined between the intermediate flanges 20, 20 and the lower flanges 16, 16.

Figure 7:
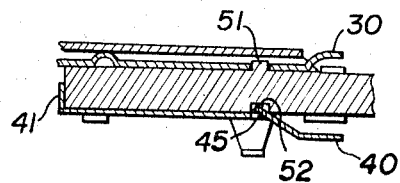
FIG. 7 is a longitudinal sectional view, partly broken away for showing the state in which the free outer end portion of an arm having a projection formed on the front side and a recess on the rear side is fit in the coupling means of the present invention.

As shown in FIG. 7, an arm of the type having a projection 51 on the front face and a recess 52 on the rear face is inserted through the arm-introducing inlet which is defined by the upper flanges 15, 15, the lower flanges 16, 16 and the side walls 12, 12. This arm is pushed continuously into this inlet until this end face of this arm hits the stopper 41 of the lower resilient member 40. Whereupon, the projection 51 is received in the receiving hole 36 of the upper resilient member 30, whereas the recess 52 is engaged by the projection 45 of the lower resilient member 40. As a result, this arm is fixed to the coupling means 4. Owing to the engagement between the projection 51 and the receiving hole 36, and to the engagement between the recess 52 and projection 45, and further by the nipping action exerted by the upper resilient member 30 and by the lower resilient member 40, the arm is prevented from its being detached spontaneously from the coupling means 4. Furthermore, the upper flanges 15, 15 and lower flanges 16, 16 of the side walls cooperatively serve to inhibit the spontaneous vertical movement of the arm.

Figure 8:
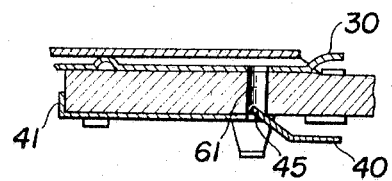
FIG. 8 is a longitudinal sectional view, partly broken away, for showing the state in which the free outer end portion of an arm having a through-hole is fit in the coupling means of the present invention.

As shown in FIG. 8, in the instance where the arm 5 having a through-hole 61 is inserted into the coupling means 4 until the end face of this arm hits the stopper 41 of the lower resilient member 40, the through-hole 61 engages the projection 45 of a lower resilient member 40, and thus the arm is fixed within the coupling means 4.

It will be easily understood that, by keeping the nose 34 of the upper resilient member in its pushed-up state and also by holding the flat portion 47 of the lower resilient member in its pushed-down state at the time the arm is inserted into the channel, these two resilient members as well as the arm both can be prevented from sustaining damages during the attaching and detaching of the arm. Furthermore, when it is intended also to remove the arm from the coupling means 4, the nose 34 and the flat portion 47 are held so that they are parted away from each other. By doing so, it will be understood easily that the arm can thus be removed without any difficulty.

In this embodiment, the upper resilient member is shown as having a fulcrum 32 at an intermediate portion of the flat portion 33. Alternatively, this fulcrum 32 may be omitted and, instead, the site at which the upper resilient member is attached to the top wall 11 of the housing may be used to serve as the fulcrum. In such an instance, it is needless to say that this upper resilient member is required to have a resiliency and such portion starting from the fixing point of this member against the top wall 11 through to the rest of the portion which as a whole inclines downwardly.

I claim:

1. Means for coupling a blade to an arm of windshield wiper for automobiles comprising:

a housing including a connecting hole for connecting the blade to this housing and having a top wall and equally shaped two side walls cooperatively defining a channel into which the arm is to be inserted, and arm-nipping means fixed within the housing and including an upper resilient member and a lower resilient member, said upper resilient member having an end fixed to the top wall at a position in the vicinity of one end of the channel, the remaining part of said upper resilient member extending from said end being inclined downwardly relative to the top wall, the other end of said upper resilient member being exposed outwardly upwardly from the other end of the channel, said upper resilient member also having intermediately thereof a receiving hole engageable with a part of said arm, said lower resilient member being fixed between the lower edges of the two side walls at a position in the vicinity of said one end of the channel, the remaining part of this lower resilient member being inclined upwardly for a distance and then inclined downwardly, said lower resilient member having, at the apex formed between these upward and downward inclinations, a projection engageable with a part of the arm, the other end of said lower resilient member being exposed obliquely downwardly from the channel.

2. Means for coupling a blade to an arm of windshield wiper for automobiles according to claim 1, in which:

the two side walls of the housing have the same inclined upper edges, respectively, at one end of the housing, said upper edges extending obliquely downwardly from that end of the top wall facing said one end of the housing, said upper edges carrying, at the bottom of their inclinations, upper flanges, respectively, extending horizontally toward each other into the channel;

the lower edges of the two side walls of the housing carry — at said one of the housing and at a position substantially beneath said upper flanges — lower flanges, respectively, extending in parallel relationship with said upper flanges;

said upper flanges are separated from each other;

said upper flanges, said lower flanges and said two side walls cooperatively define an arm-introducing inlet and at the same time serve as a guide for the insertion of the arm into the channel;

said one end of the top wall, the inclined upper edges of the side walls and said upper flanges cooperatively define an aperture for allowing one end of the upper resilient member to expose itself therefrom; and there is provided an anchoring hole in the vicinity of the other end of the top wall for anchoring the upper resilient member.

3. Means for coupling a blade to an arm of windshield wiper for automobiles according to claim 2, in which the two side walls of the housing each has, at its other end, an enlarged portion downwardly offset from the central longitudinal axis of the channel and provided with said connecting hole for the connection of the blade to the housing.

4. Means for coupling a blade to an arm of windshield wiper for automobiles according to claim 3, in which the two side walls of the housing each has at its bottom edge, an engaging finger for engagement with said lower resilient member.

5. Means for coupling a blade to an arm of windshield wiper for automobiles according to claim 4, in which said two side walls of the housing each has a downwardly projecting portion at a site between said lower flange and said engaging finger and also has an intermediate flange, at the bottom edge of the projecting portion, extending horizontally into the channel for defining the lower limit of the movement of said lower resilient member.

6. Means for coupling a blade to an arm of windshield wiper for automobiles according to claim 5, in which said upper resilient member of the arm nipping means has, as a continuous structure starting from one end to the other end, a horizontal fixing portion having a fixing hole, a downwardly obliquely inclined portion, a flat portion, an upwardly curved fulcrum, a resilient portion obliquely downwardly inclined at an angle more gentle than that of the aforesaid inclined portion and provided with said receiving hole at its foremost end, and an upwardly obliquely inclined nose, all as contiguous and integral parts.

7. Means for coupling a blade to an arm of windshield wiper for automobiles according to claim 6, in which the lower resilient member of said arm-nipping means has, as a continuous structure starting from one end to the other end, an upright stopper for the arm, a broadened portion having engaging grooves formed at its side edges, a resilient portion inclined obliquely upwardly, an inclined portion inclined obliquely downwardly and provided at its apex with the aforesaid projection, and a flat portion, all as contiguous and integral parts, said apex being formed by said obliquely upwardly inclined portion and said obliquely downwardly inclined portion.

* * * * *